United States Patent
Hiroi et al.

Patent Number: 5,745,362
Date of Patent: Apr. 28, 1998

[54] DIGITAL PID CONTROL APPARATUS

[75] Inventors: Kazuo Hiroi; Yoshiyuki Yamamoto, both of Tokyo, Japan

[73] Assignee: Kabushiki Kaisha Toshiba, Kawasaki, Japan

[21] Appl. No.: 666,089

[22] Filed: Jun. 19, 1996

[30] Foreign Application Priority Data

Jun. 20, 1995 [JP] Japan ................................. 7-153392

[51] Int. Cl.⁶ .......................... G05B 13/02; G05B 11/42
[52] U.S. Cl. .......................... 364/162; 364/150; 364/151; 364/163; 318/610; 318/615
[58] Field of Search .................... 364/158, 157, 364/149, 160–163, 164–165, 567, 150–151, 148, 174, 176; 318/632, 609–610, 561

[56] References Cited

U.S. PATENT DOCUMENTS

| | | | |
|---|---|---|---|
| 3,834,617 | 9/1974 | Dyntar | 165/253 |
| 4,430,698 | 2/1984 | Harris | 364/162 |
| 4,466,054 | 8/1984 | Shigemasa et al. | 364/162 |
| 4,563,735 | 1/1986 | Hiroi et al. | 364/165 |
| 4,714,988 | 12/1987 | Hiroi et al. | 364/165 |
| 4,755,924 | 7/1988 | Hiroi | 364/148 |
| 5,059,880 | 10/1991 | Hiroi | 318/610 |
| 5,119,288 | 6/1992 | Hiroi | 364/163 |
| 5,311,421 | 5/1994 | Nomura et al. | 364/157 |
| 5,442,273 | 8/1995 | Ikawa et al. | 318/799 |
| 5,477,457 | 12/1995 | Okada | 364/426.04 |
| 5,535,117 | 7/1996 | Hiroi | 364/158 |

FOREIGN PATENT DOCUMENTS

| | | |
|---|---|---|
| 0 362 801 | 4/1990 | European Pat. Off. |
| 022599003 | 10/1990 | European Pat. Off. |
| 0 406 836 | 4/1994 | European Pat. Off. |
| 2236224 | 1/1975 | France |
| 2524169 | 9/1983 | France |
| 5-35306 | 2/1993 | Japan |
| 5-100714 | 4/1993 | Japan |
| 0 334 205 | 12/1995 | Japan |
| 07 334 204 | 12/1995 | Japan |
| 08 076 804 | 3/1996 | Japan |

OTHER PUBLICATIONS

Hiroi, "The Basic and Application of the Digital Instrumentatiion Control System", Ind. Technology Corp., pp. 90–95, 1987.

Sato, et al., "Steam temperature prediction control for thermal power plant", IEEE Trans. on Power Apparatus & Systems, PAS–103, No. 9, pp. 2382–2387, Sep. 1984.

(List continued on next page.)

*Primary Examiner*—Emanuel T. Voeltz
*Assistant Examiner*—Cuong H. Nguyen
*Attorney, Agent, or Firm*—Oblon, Spivak, McClelland, Maier & Neustadt, P.C.

[57] ABSTRACT

In the digital PID (P:proportional, I:integral, D:derivative) control apparatus of the present invention, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the derivation processing unit includes the judgment unit for judging whether $K=2 \cdot \Delta t/(\Delta t+2\eta \cdot TD) \leq 1$, or $K>1$ by using a control operation period $\Delta t$, a derivative time $TD$ and a derivative gain $1/\eta$, and the operation unit which carries out a lagged derivative operation by a bilinear transfer method when $K \leq 1$, or carries out an exact derivative operation when $K>1$.

6 Claims, 5 Drawing Sheets

OTHER PUBLICATIONS

M. Nomura, et al., "Adaptive optimal control of steam temperatures for thermal power plants", IEEE Trans. on Energy Conversion, vol. 4, No. 1, pp. 25–33, Mar. 1989.

T. Soderstrom, et al. "Identifiability conditions for linear multi-variable systems operating under feedback", IEEE Trans. on Automatic Control, vol. AC–21, No. 6, pp. 837–840, Dec. 1976.

M. Nomura, "Adaptive Optimal Control of Steam Temperature for Thermal Power plants", IEEE Trans. on Energy Conversion, IEEE/ASME Sep. 29, 1988, Joint Power Generation Conference, Philadelphia, PA.

Robert J. Bibbero, "Microprocessors in Instruments and Control", Ch.6, Development of Digital Control Algorithm, pp. 155–162, 1977.

Nisenfeld, et al., "Velocity–Control Algorithms", Instrument Society of America, pp. 204–206, 1981.

Kazuo Hiroi, "Let's Cook Digital Differentiation for Further Utilization of DCS", vol. 37 No. 8, 9, 10. Aug. to Oct., 1994, Proceedings of the 34th SICE Annual Conference, 563/564 Comparison of Digital Derivative Calculation Methods for PID Control, Jul. 27, 1995.

Yoshiyuki Yamamoto, et al. "Comparison of Digital Derivative Calculation Methods for PID Control", Proceedings of the 34th SICE Annual Conference, 563/564 Comparison of Digital Derivative Calculation Methods for PID Control, Jul. 27, 1995.

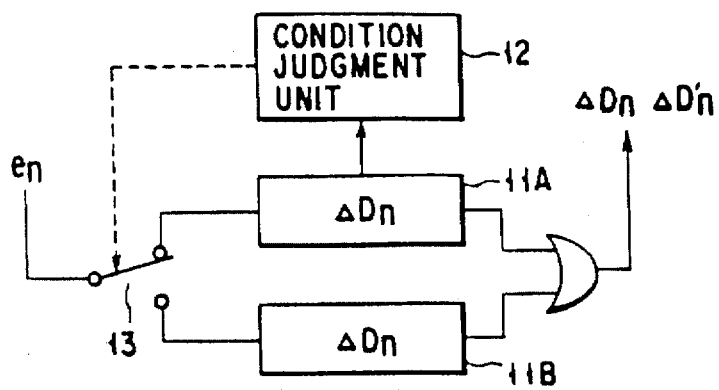
F I G. 5
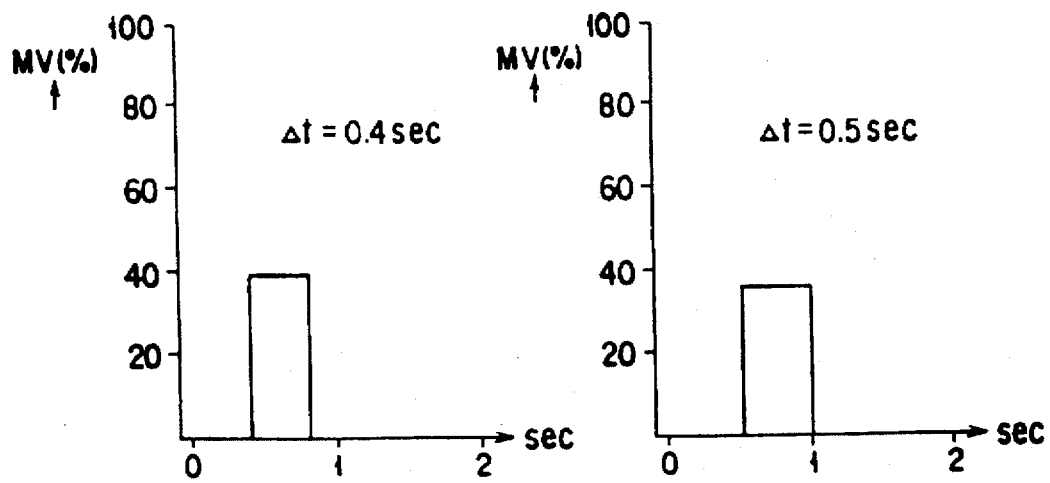
F I G. 6A    F I G. 6B
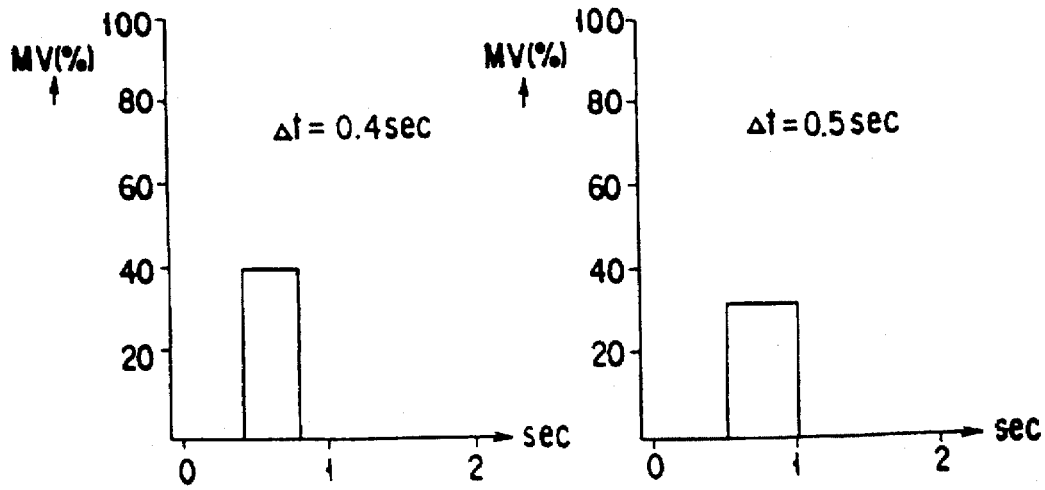
F I G. 7A    F I G. 7B

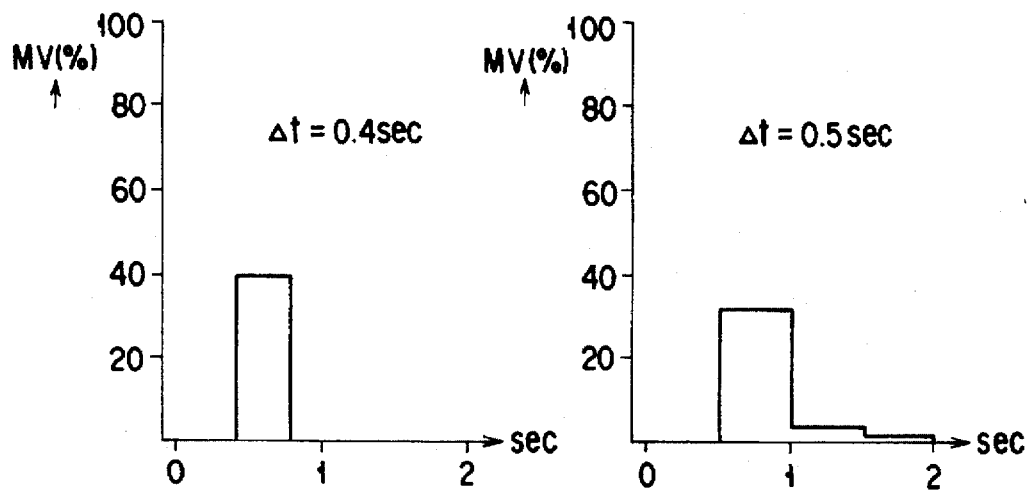
F I G. 8A   F I G. 8B
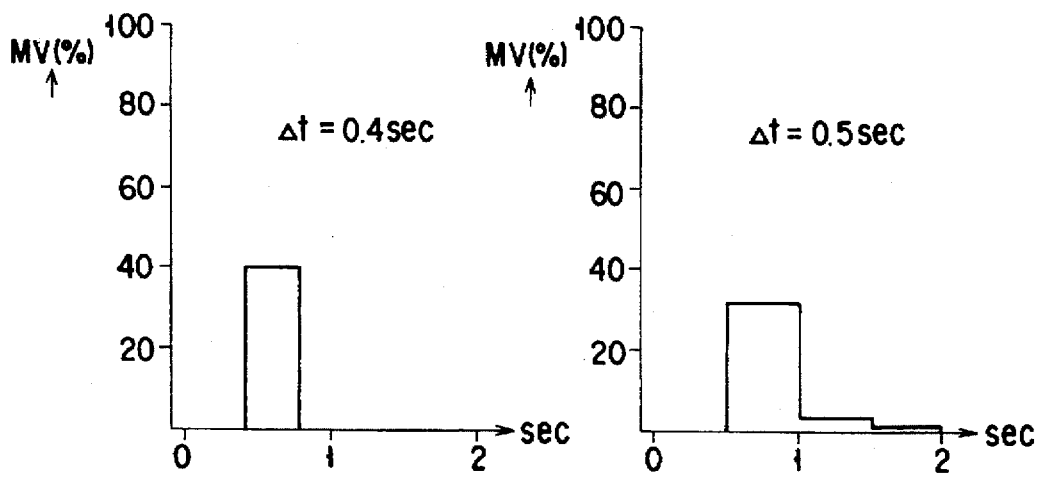
F I G. 9A   F I G. 9B
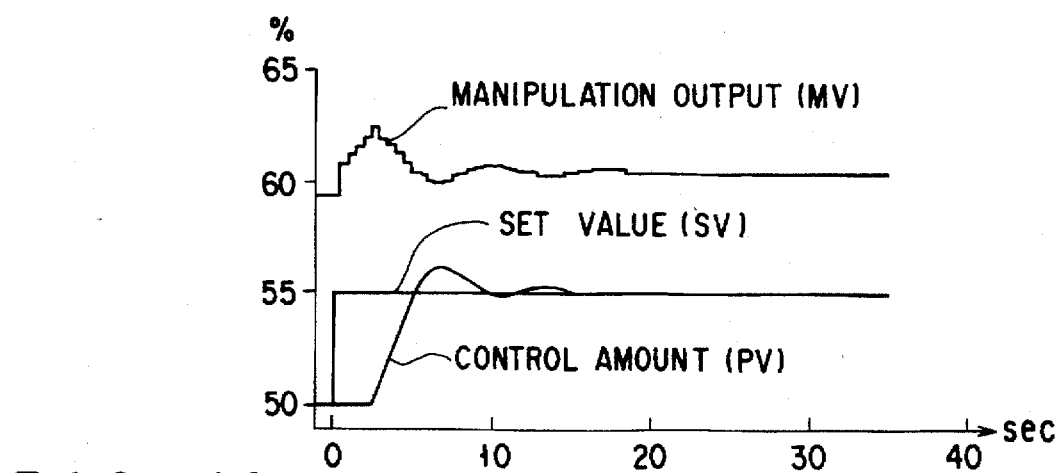
F I G. 10

DIGITAL PID CONTROL APPARATUS

BACKGROUND OF THE INVENTION

1. Field of the Invention

The present invention relates to a digital PID control apparatus used in various process instrumentation control systems.

2. Description of the Related Art

The PID (P:proportional action, I:integral action, D:derivative action) control mode is considered as the main mode of the feedback controls directly acting on plants, event at present time where the plants are driven at substantially the optimal efficiency with an advanced flexibility, and the PID control mode is widely used in many process controls.

The basic formula of the PID control is expressed in a sum of a proportional action (P action) for outputting a calculation result which is proportional to a deviation, an integral action (I action) for outputting a calculation result which is proportional to an integration of the deviation, and a derivative action (D action) for outputting a calculation result which is proportional to a derivative of the deviation. The basic formula can be expressed in the form of transfer function as the formula (1) below:

$$C(s)=MV(s)/E(s)=KP\{1+1/TI\cdot s\}+(TD\cdot s)/(1+\eta\cdot TD\cdot s)\} \quad (1)$$

where $C(s)$: transfer function of PID, $MV(s)$:operation amount, $E(s)$:deviation, $KP$:proportional gain, $TI$:integrated time, $TD$:derivative time, $s$:Laplace operator, and $1/\eta$:derivative time.

The formula (1) can be expressed in the form of velocity-type digital operation formula by use of a control operation period $\Delta$, as the following formulas (2a) and (2b):

$$\Delta MV_n=KP\{(e_n-e_{n-1})+(\Delta t/TI)\cdot e_n+\Delta D_n\} \quad (2a)$$

$$MV_n=MV_{n-1}+\Delta MV_n \quad (2b)$$

Further, the derivative output Dn can be expressed using backwards difference by the formula (3a) and (3b):

$$\Delta D_n=\{TD/(\Delta t+\eta\cdot TD)\}\cdot(e_n-e_{n-1})-(\Delta t/(\Delta t+\eta\cdot TD)\}\cdot D_{n-1} \quad (3a)$$

$$Dn=D_{n-1}+\Delta D_n \quad (3b)$$

where $MV_n$: operation amount at present point, $MV_{n-1}$: operation amount at previous control operation period, $\Delta MV_n$: a difference in operation amount from previous time to present time, $e_n$: the amount of deviation at the present point, $e_{n-1}$: the amount of deviation at the immediately previous control operation period, $D_n$: derivative output at present point; $D_{n-1}$: derivative output at previous control operation period; $\Delta D_n$: a difference in derivative output from previous time to present time, and $\Delta t+\eta\cdot TD$: effective differential gain.

FIG. 1 is a diagram showing the structure of digital PID control apparatus operating on the basis of the formulas (2a) to (3b).

In this apparatus, a deviation "$e_n$" between a target value $SV_n$ and a control amount $PV_n$ is obtained by a deviation operating unit 51, and then the deviation en is supplied to a velocity type proportional control unit 52, a velocity type integral portion 53 and a velocity type derivative control unit 54. The velocity type proportional control unit 52 calculates $\Delta P_n=e_n-e_{n-1}$ by a proportional adjustment operation, the velocity type integral controlling unit 53 calculates $\Delta I_n=(\Delta t/TI)\cdot e_n$ by integral adjustment operation, and the velocity type derivative control unit 54 calculates $\Delta D_n$ by the operations of the formulas (3a) and (3b). Further, an output of each calculation result is guided to an adding unit 55, where an adding synthesis is carried out to obtain $\Delta P_n+\Delta In+\Delta D_n$.

After a while, a proportional gain KP is multiplied with an addition output from the adding unit 55, at a proportional gain unit 56, thereby obtaining a velocity type signal, that is, $\Delta MV_n=KP(\Delta P_n+\Delta I_n+\Delta Dn)$, which is further supplied to a velocity type/position type signal converting unit 57. In this signal converting unit 57, the velocity type signal is converted into a position type manipulation signal $MV_n$ by performing an operation of $MV_n=MV_{n-1}+\Delta MV_n$, and the converted signal is supplied to a control object 58. Thus, the controlling amount $PV_n$ and the target value $SV_n$ are equalized to each other, in other words, the deviation $e_n=(SV_n-PV_n)$ is made zero.

It should be noted that in order to calculate $\Delta D_n$ and $D_n$ of the formulas (3a) and (3b), it is required that the control operation period $\Delta t$ be sufficiently small as compared to ($\eta\cdot TD$). However, in the DDC (direct digital control) employed in an actual plant, the relationship in amount between the control operation period $\Delta t$ and ($\eta\cdot TD$) is not satisfied in many cases, and there are some cases in which the relationship in amount is completely reversed.

In order to solve this problem, there is proposed a bilinear transfer mode as one of the derivative calculation methods which can be operated even if the control operation period $\Delta t$ is larger than those of the formulas (3a) and (3b).

In connection with the derivative operation, when the bilinear transfer method is employed, and the differentiation conversion is carried out, the velocity type derivative digital operation formulas (4a) and (4b) as below can be obtained.

$$\Delta D_n=\{(2\cdot TD)/(\Delta t+2\eta\cdot TD)\}\cdot(e_n-e_{n-1})-(2\cdot\Delta t)/(\Delta t+2\eta\cdot TD)\}\cdot D_{n-1} \quad (4a)$$

$$D_n=D_{n-1}+\Delta D_n \quad (4b)$$

As is clear from the formulas (4a) and (4b), when the bilinear transfer method is employed, the control operation period $\Delta t$ can be doubled as compared to those of the formulas (3a) and (3b).

However, when the above bilinear transfer method is employed in the control system under the condition represented by the formula (5) below, an oscillation response which involves a resonance phenomenon shown in FIG. 2, as an example, is obtained.

$$(2\cdot\Delta t)/(\Delta t+2\eta\cdot TD)>1 \quad (5)$$

The simulation conditions regarding what is shown in FIG. 2 are: the control operation period $\Delta t=0.5$ sec, $\eta=0.1$, the proportional gain KP, which is a PID parameter, =2.5, the integral time TI=3.2 sec, and the derivative time TD=0.8 sec, with respect to the control object $G(s)=e^{-2s}/(1+5s)$.

Therefore, with regard to the digital control operation methods such as expressed by the formulas (4a) and (4b), the control operation period $\Delta t$ can be set high by employing the bilinear transfer method; however at the same time, the control may become very unstable, depending upon the relationship between the control operation period $\Delta t$ and the derivative time TD.

SUMMARY OF THE INVENTION

The object of the present invention is to provide a digital PID control apparatus capable of maintaining the stability of the control and the safety of the plant, even for a digital derivative action employing a bilinear transfer method.

According to an aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising: a derivation processing unit including a judgment unit for judging a control operating period is a predetermined value or less, and an operation unit which carries out a lagged derivative operation by a bilinear transfer method when the control operation period is at the predetermined value or less, or carries out an exact derivative operation when the control operating period is larger than the predetermined value.

According to another aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising: a derivation processing unit including a judgment unit for judging whether $K=2\cdot\Delta t/(\Delta t+2\eta\cdot TD)\leq 1$, or $K>1$ by using a control operation period $\Delta t$, a derivative time $TD$ and a derivative gain $1/\eta$, and an operation unit which carries out a lagged derivative operation by a bilinear transfer method when $K\leq 1$, or carries out an exact derivative operation when $K>1$.

According to still another aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising: a derivation processing unit further comprising: a judgment unit for judging whether $K=2\cdot\eta t/(\Delta t+2\eta\cdot TD)\leq 1$, or $K>1$ by using a control operation period $\Delta t$, a derivative time $TD$ and a derivative gain $1/\eta$, and means for carrying out the velocity type D control operation on the deviation, including a means for extracting velocity type D control operation results $\Delta D_n$, $\Delta D'_n$ and a derivative output $D_n$ by performing the following operation:

when $K\leq 1$, $\Delta D_n=\{(2\cdot TD)/(\Delta t+2\eta\cdot TD)\}\cdot(e_n-e_{n-1})-K\cdot D_{n-1}$ $D_n=D_{n-1}+\Delta D_n$ when $K>1$, $\Delta D'_n=\{(2\cdot TD)/(\Delta t+2\eta\cdot TD)\}\cdot(e_n-2e_{n-1}+e_{n-2})$ $D_n=D_{n-1}+\Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when $K\leq 1$, $\Delta D_n=\{(2\cdot TD)/(\Delta t+2\eta\cdot TD)\}\cdot(PV_{n-1}-PV_n)-K\cdot O_{n-1}$ $D_n=D_{n-1}+\Delta D_n$ when $K>1$, $\Delta D'_n=\{(2\cdot TD)/(\Delta t+2\eta\cdot TD)\}\cdot(2PV_{n-1}-PV_n-PV_{n-2})$ $D_n=D_{n-1}+\Delta D'_n$, where $e_n$: the amount of deviation at the present time, $e_{n-1}$: the amount of deviation at the time of the immediately previous control operation period, en-2: the amount of deviation at the time of one before the immediately previous control operation period, $PV_{n-1}$: the control amount at the time of the immediately previous control operation period, $PV_{n-2}$: the control amount at the time of one before the immediately previous control operation period, $D_n$: the derivative output at present time, and $D_{n-1}$: the derivative output at the time of the immediately previous control operation period.

According to still another aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising: a derivation processing unit further comprising: a judgment unit for judging whether $K=2\cdot\Delta t/(\Delta t+2\eta\cdot TD)\leq 1$, or $K>1$ by using a control operation period $\Delta t$, a derivative time $TD$ and a derivative gain $1/\eta$, and means for carrying out the velocity type D control operation on the deviation, including a means for extracting velocity type D control operation results $\Delta D_n$, $\Delta D'_n$, and a derivative output $D_n$ by performing the following operation:

when $K\leq 1$, $\Delta D_n=\{(2\cdot TD)/(\Delta t+2\eta\cdot TD)\}\cdot(e_n-e_{n-1})-K\cdot D_{n-1}$ $D_n=D_{n-1}+\Delta D_n$ when $K>1$, $\Delta D'_n=(TD/\Delta t)\cdot(e_n-2e_{n-1}+e_{n-2})$ $D_n=D_{n-1}+\Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when $K\leq 1$, $\Delta D_n=\{(2\cdot TD)/(\Delta t+2\eta\cdot TD)\}\cdot(PV_{n-1}-PV_n)-K\cdot D_{n-1}$ $D_n=D_{n-1}+\Delta D_n$ when $K>1$, $\Delta D'_n=(TD/\Delta t)\cdot(2PV_{n-1}-PV_n-PV_{n-2})$ $D_n=D_{n-1}+\Delta D'_n$, where $e_n$: the amount of deviation at the present time, $e_{n-1}$: the amount of deviation at the time of the immediately previous control operation period, $e_{n-2}$: the amount of deviation at the time of one before the immediately previous control operation period, $PV_n$: the control amount at present time, $PV_{n-1}$: the control amount at the time of the immediately previous control operation period, $PV_{n-2}$: the control amount at the time of one before the immediately previous control operation period, $D_n$: the derivative output at present time, and $D_{n-1}$: the derivative output at the time of the immediately previous control operation period.

According to still another aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising:

a derivation processing unit further comprising: a judgment unit for judging whether $K=2 \cdot \Delta t/(\Delta t+2\eta \cdot TD) \leq 1$, or $K>1$ by using a control operation period $\Delta t$, a derivative time $TD$ and a derivative gain $1/\eta$; and means for carrying out the velocity type D control operation on the deviation, including a means for extracting velocity type D control operation results $\Delta D_n$, $\Delta D'_n$ and a derivative output $D_n$ by performing the following operation:

when $K \leq 1$,
$\Delta D_n=\{(2 \cdot TD)/(\Delta t+2\eta \cdot TD)\} \cdot (e_n-e_{n-1})-K \cdot D_{n-1}$
$D_n=D_{n-1}+\Delta D_n$
when $K>1$,
$\Delta D'_n=(TD/\Delta t) \cdot (e_n-e_{n-1}) -\{(\Delta t+2\eta \cdot TD)/(2 \cdot \Delta t)\} \cdot D_{n-1}$
$D_n=D_{n-1}+\Delta D'_n$; and means for carrying out the velocity type D control operation on the controlling amount, including a means for extracting velocity type D control operation results $\Delta D_n$, $\Delta D'_n$, and a derivative output $D_n$ by performing the following operation:

when $K \leq 1$,
$\Delta D_n=\{(2 \cdot TD)/(\Delta t+2\eta \cdot TD)\} \cdot (PV_{n-1}-PV_n)-K \cdot D_n)$
$D_n=D_{n-1}+\Delta D_n$
when $K>1$,
$\Delta D'_n=(TD/\Delta t) \cdot (PV_{n-1}-PV_n) -\{(\Delta t+2\eta \cdot TD)/(2 \cdot \Delta t)\} \cdot D_{n-1}$
$D_n=D_{n-1}+\Delta D'_n$, where $e_n$: the amount of deviation at the present time, en−1: the amount of deviation at the time of the immediately previous control operation period, $PV_n$: the control amount at present time, $PV_{n-1}$: the control amount at the time of the immediately previous control operation period, $D_n$: the derivative output at present time, and $D_{n-1}$: the derivative output at the time of the immediately previous control operation period.

According to still another aspect of the present invention, there is provided a digital PID (P:proportional, I:integral, D:derivative) control apparatus, in which a deviation is obtained from a controlling amount of an object to be controlled, and a target value, a velocity type PI control operation is carried out on the deviation, a velocity type D control operation is carried out on the deviation or the controlling amount, these velocity type control operation outputs are synthesized, and then converted into a position type manipulation signal, and this signal is supplied to the object to be controlled, the digital PID control apparatus comprising:

a derivation processing unit further comprising: a judgment unit for judging whether $K=2 \cdot \Delta t/(\Delta t+2\eta \cdot TD) \leq 1$, or $K>1$ by using a control operation period $\Delta t$, a derivative time $TD$ and a derivative gain $1/\eta$; and means for carrying out the velocity type D control operation on the deviation, including a means for extracting velocity type D control operation results $\Delta D_n$, $\Delta D'_n$ and a derivative output $Dn$ by performing the following operation:

when $K \leq 1$,
$\Delta D_n=\{(2 \cdot TD)/(\Delta t+2\eta \cdot TD)\} \cdot (e_n-e_{n-1})-K \cdot D_{n-1}$
$D_n=D_{n-1}+\Delta D_n$
when $K>1$,
$\Delta D'_n=(TD/\Delta t) \cdot (e_n-e_{n-1}) -\{\Delta t/(\Delta t+\eta \cdot TD)\} \cdot D_{n-1}$
$D_n=D_{n-1}+\Delta D'_n$; and means for carrying out the velocity type D control operation on the controlling amount, including a means for extracting velocity type D control operation results $\Delta D_n$, $\Delta D'_n$, and a derivative output $Dn$ by performing the following operation:

when $K \leq 1$,
$\Delta D_n=\{(2 \cdot TD)/(\Delta t+2\eta \cdot TD)\} \cdot (PV_{n-1}-PV_n)-K \cdot D_{n-1})$
$D_n=D_{n-1}+\Delta D_n$
when $K>1$,
$\Delta D'_n=(TD/\Delta t) \cdot (PV_{n-1}-PV_n) -\{\Delta t/(\Delta t+\eta \cdot TD)\} \cdot D_{n-1}$
$D_n=D_{n-1}+\Delta D'_n$, where $e_n$: the amount of deviation at the present time, $e_{n-1}$: the amount of deviation at the time of the immediately previous control operation period, $PV_n$: the control amount at present time, $PV_{n-1}$: the control amount at the time of the immediately previous control operation period, $D_n$: the derivative output at present time, and $D_{n-1}$: the derivative output at the time of the immediately previous control operation period.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a block diagram showing another example of the structure of the velocity type differentiating process unit provided in the digital PID control apparatus shown in FIG. 4;

FIGS. 6A and 6B are diagrams showing the response characteristics in the case where the derivative action according to the first embodiment of the present invention is employed;

FIGS. 7A and 7B are diagrams showing the response characteristics in the case where the derivative action according to the second embodiment of the present invention is employed;

FIGS. 8A and 8B are diagrams showing the response characteristics in the case where the derivative action according to the third embodiment of the present invention is employed;

FIGS. 9A and 9B are diagrams showing the response characteristics in the case where the derivative action according to the fourth embodiment of the present invention is employed; and FIG. 10 is a diagram showing a simulation result obtained by the derivative action of the second embodiment.

DETAILED DESCRIPTION OF THE PREFERRED EMBODIMENT

Prior to the detailed description of the embodiments of the present invention, the relationship between the control operation period $\Delta t$ and the derivative time TD, which causes instability in the control when using the digital derivative action method employing the bilinear transfer method, will now be described for the reader to be able to more easily understand the contents of the present invention.

When the increment $(e_n - e_{n-1})$ in the deviation in the formula (4a) is rendered zero, and a difference $\Delta D_n$ in the derivative output from the immediately previous time to the present time becomes larger than the derivative output $D_{n-1}$ at the immediately previous control operation period, the first half term of the formula is zero since the increment in the deviation is zero, and therefore the following formula (22) is obtained from the last half term of the formula (4a):

$$\Delta D_n = -\{(2 \cdot TD)/(\Delta t + 2 \cdot \eta \cdot TD)\} \cdot D_{n-1} \text{ that is, } 2 \cdot TD/(\Delta t + 2 \cdot \eta \cdot TD) > 1 \quad (22)$$

When a coefficient K is assigned to the left side of the formula (22), the following formula is obtained:

$$K = 2 \cdot TD/(\Delta t + 2 \cdot \eta \cdot TD) \quad (23)$$

Based on the formula (23), the relationship between the control operation period $\Delta t$ and the derivative time TD, will now be described.

First, as described in connection with the conventional example, when the control operation period $\Delta t$ is rendered larger than $\eta \cdot TD$, an oscillation occurs. In order to specify the cause for the oscillation, the open loop characteristics obtained when the digital derivative action method employing the bilinear transfer is applied, are examined while fixing the derivative time TD=2 sec and the derivative gain $\eta = 0.1$, and varying the control operation period $\Delta t$, as can be seen in FIGS. 3A to 3D, and the obtained values in terms of the response properties are compared.

Figure 3A:
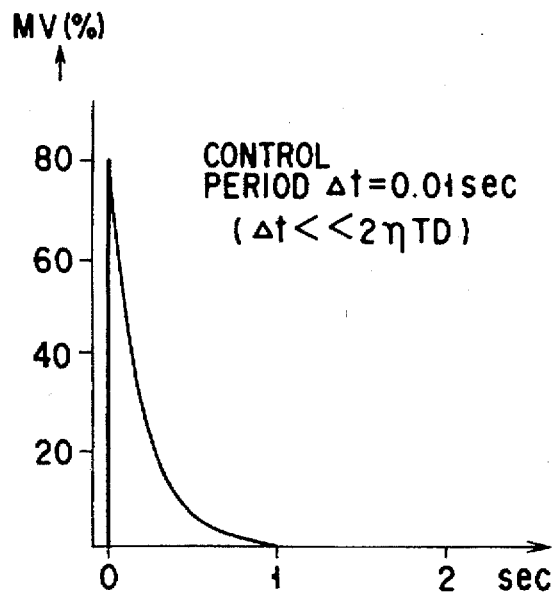
FIGS. 3A to 3D are diagrams showing the open loop response characteristics of the conventional digital PID control apparatus, in the case where various control operation period is varied in various ways by the bilinear transfer method.

FIG. 3A illustrates an example when the control operation period $\Delta t = 0.01$ sec. In this example, $K \ll 1$ ($\Delta t \ll 2 \cdot \eta \cdot TD$). As can be seen in this figure, derivative response characteristics similar to those of the backward difference method or the conventionally used simplified operation method expressed by the formula (3a) and (3b), can be obtained.

Figure 3B:
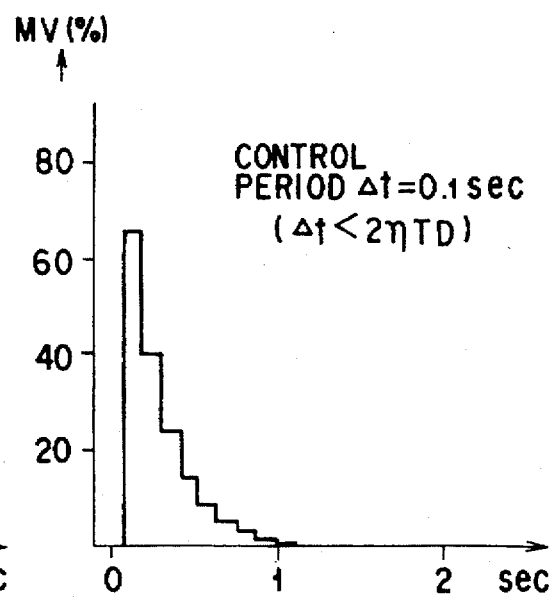

FIG. 3B illustrates an example when the control operation period $\Delta t = 0.1$ sec. In this example, $K < 1$. As can be seen in this figure, derivative response characteristics different from those of the backwards difference method expressed by the formula (3a) and (3b), gradually starts to appear.

Figure 3C:
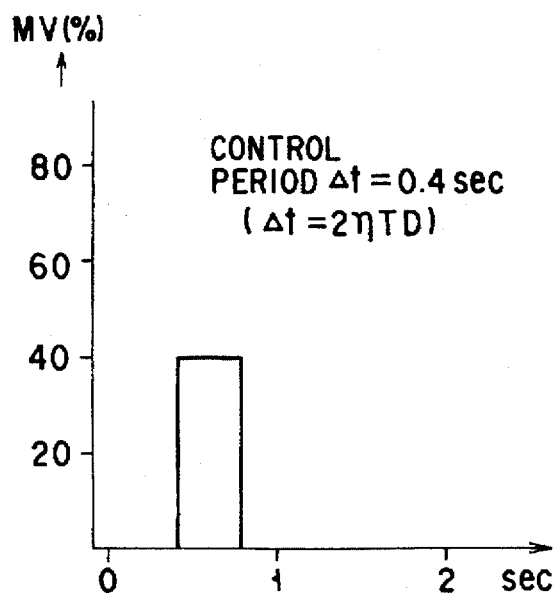

FIG. 3C illustrates an example when the control operation period $\Delta t = 0.4$ sec. In this example, $K = 1$ ($\Delta t = 2 \cdot \eta \cdot TD$). As can be seen in this figure, complete derivative type response characteristics can be obtained.

Figure 3D:
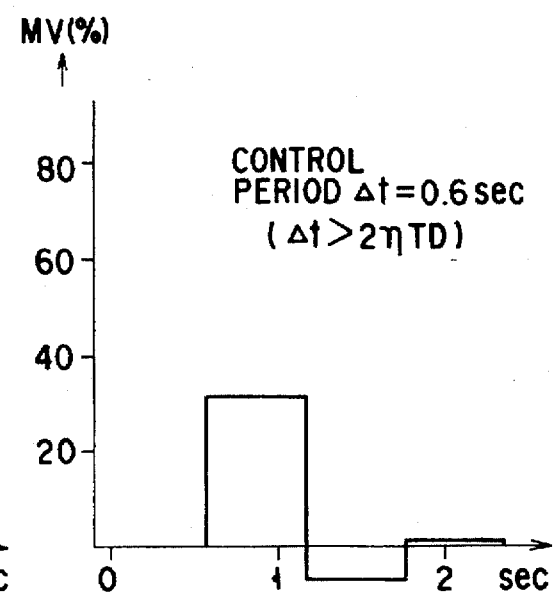

FIG. 3D illustrates an example when the control operation period $\Delta t = 0.6$ sec. In this example, $K > 1$ ($\Delta t > 2 \cdot \eta \cdot TD$). As can be seen in this figure, a pull-back phenomenon, in which the derivative output is inverted (in a negative direction), occurs. More specifically, in the case of a bilinear transfer, a closer approximation to the continuous type differentiation (ideal differentiation) than that of the case of the backwards difference method; however, in a region where $\Delta t > 2 \cdot \eta \cdot TD$, a pull-back phenomenon occurs.

Consequently, when an operation control unit involving the derivative action in which a pull-back phenomenon occurs as shown in FIG. 3D, is applied to an object to be controlled, the response becomes unstable, and when the control operation period $\Delta t$ is further prolonged, an oscillation occurs. Therefore, in order to obtain a stable derivative output, it is required that the derivative action should be carried out under the judgment condition where a pull-back phenomenon, which is an oscillation factor in the derivative action, does not occur.

Regarding the apparatus of the present invention, the above-stated formula (23), that is, $$K = 2 \cdot \Delta t/(\Delta t + 2 \cdot \eta \cdot TD) \quad (24)$$

is considered as a judgment condition value, and the derivative action formula is changed depending upon whether K is larger than 1 or smaller than 1. In this manner, a PID operation control unit, which is stable regardless of the characteristics of the object to be controlled, can be obtained, and the safety of the plant can be improved.

Embodiments of the present invention will now be described with reference to accompanying drawings.

(First Embodiment)

Figure 4:
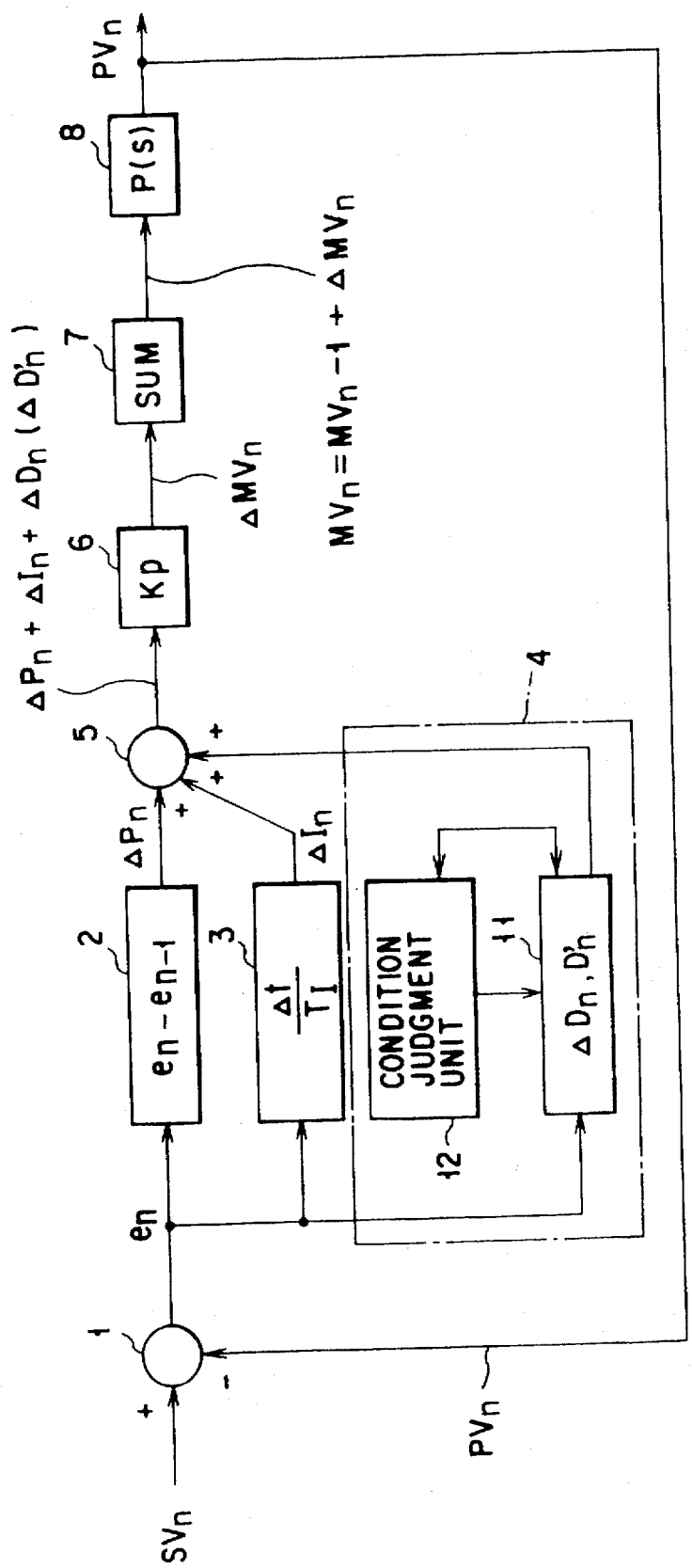
FIG. 4 is a block diagram showing the structure of a PID control apparatus according to the present invention.

FIG. 4 is a block diagram showing the structure of a PID control apparatus according to the present invention. The control apparatus includes a deviation operation unit 1 for calculating a deviation en between a target value $SV_n$ and a control amount $PV_n$ ($e_n = SV_n - PV_n$), a velocity type proportional control unit 2 for calculating a proportional operation unit $\Delta P_n$ by carrying out the following operation:

$$\Delta P_n = e_n - e_{n-1}$$

using the deviation en and the deviation at the immediately previous time, $e_{n-1}$, obtained from the deviation operation unit 1, and a velocity type integral control unit 3 for calculating an integral operation output $\Delta I_n$ by carrying out the following operation:

$$\Delta I_n = (\Delta t/TI) \cdot e_n$$

using the deviation $e_n$ obtained from the deviation operation unit 1, the control operation period $\Delta t$ and the integral time TI.

In the apparatus, the velocity differentiating process unit 4 for calculating an operation output which is proportional to the derivative of the deviation en, is provided.

The velocity derivation processing unit 4 includes a velocity type derivative control unit 11 for carrying out a velocity type derivative action based on the following operation formula:

$$\Delta D_n = \{(A \cdot 2 \cdot TD)/(\Delta t + 2 \cdot \eta \cdot TD)\} \cdot (e_n - e_{n-1}) - B \cdot D_n \quad (25)$$

using the bilinear transfer as a derivative term of the deviation $e_n$, and condition judgment unit 12 for judging whether a judgment reference value K of the formula (24) is $K \leq 1$ or $K > 1$, setting correction coefficients A and B to the formula (25) of the derivative control unit 11 in accordance with the following condition:

when $K \leq 1$, A=1, B=K, or when $K > 1$, A=1, B=1 and allowing the apparatus to carry out a derivative action.

Further, the apparatus includes an adding unit 5 for adding and synthesizing operation outputs from the control units 2 and 3 and the process unit 4, a proportional gain unit 6 for multiplying the synthesized output with a proportional gain KP, a velocity type/position type signal conversion unit 7 for converting a velocity type signal to a position signal, and an object 8 to be controlled.

A difference $\Delta D_n$ in the derivative output obtained from the velocity type derivative control unit 11 of the velocity type derivation process unit 4, will be as follows, depending upon the level of the judgment reference value K:

when $K \leq 1$, $$\Delta D_n = \{(2 \cdot TD)/(\Delta t + 2 \cdot \eta \cdot TD)\} \cdot (e_n - e_{n-1}) - K \cdot D_{n-1} \quad (26)$$

$K > 1$, $$\Delta D_n = \{(2 \cdot TD)/(\Delta t + 2 \cdot \eta \cdot TD)\} \cdot (e_n - 2e_{n-1} + e_{n-2}) \quad (27)$$

where $D_n$: the derivative output at the present time; $e_n$: the amount of deviation at the present time; $e_{n-1}$: the amount of deviation at the time of the immediately previous control operation period; $e_{n-2}$: the amount of deviation at the time of one before the immediately previous control operation period; $1/\eta$: derivative gain and K:coefficient.

When the velocity type signal is converted into a position type differentiation signal by use of a difference $\Delta D_n$ in derivative output, the following relationships can be induced:

When $K \leq 1$, $$D_n = D_{n-1} + \Delta D_n \text{ of the formula (26)} \quad (28)$$

When $K > 1$, $$D_n = D_{n-1} + \Delta D'_n \text{ of the formula (27)} \quad (29)$$

With the above-described structure of the embodiment, when the judgment condition value K is equal to 1 or smaller, the derivative output by the bilinear transfer such as shown in FIG. 6A is obtained. However, when the judgment condition value K is larger than 1, the pull-back of the derivative output is completely cut as shown in FIG. 6B by performing the derivative action of a complete derivative type. Therefore, an oscillation response along with a resonance phenomenon, is never generated, and therefore the stability of control can be maintained.

As another example of the velocity type derivation processing unit 4, the following structure can be considered.

That is, as shown in FIG. 5, a first velocity type derivative control unit 11A and a second velocity type derivative control unit 11B for carrying out operations of differences $\Delta D_n$ and $\Delta D'_n$ in derivative output such as in the formulas (26) and (27) are prepared in advance, and each of the control units 11A and 11B are switched over by means of a switch unit 13 in accordance with the result of judgment by the condition judgment unit 12, that is, whether $K \leq 1$ or $K > 1$.

Further, the above-described embodiment has the structure in which a feedback signal, which indicates the controlling amount $PV_n$, is guided to the deviation operation unit 1 for calculating the target value and the deviation. For example, it is possible that in the case of a proceeding derivative action control apparatus for carrying out a derivative action on a control amount, a difference in derivative output is calculated by the following operation:

When $K \leq 1$, $$\Delta D_n = \{(2 \cdot TD)/(\Delta t + 2 \cdot \eta \cdot TD)\} \cdot (PV_{n-1} - PV_n) - K \cdot D_{n-1} \quad (30)$$

$K > 1$, $$\Delta D'_n = \{(2 \cdot TD)/(\Delta t + 2 \cdot \eta \cdot TD)\} \cdot (2PV_{n-1} - PV_n + PV_{n-2}) \quad (31)$$

(Second Embodiment)

This embodiment involves a velocity derivation processing unit 4 which has the same structure as that shown in FIG. 4 or 5, except that the following correction coefficients A and B are set when $K \leq 1$ and $K > 1$.

More specifically, under the following conditions:

that is, when $K \leq 1$, A=1, B=K, or when $K > 1$, A=1/K, B=1, the condition judgment unit 12 sets the correction coefficients A and B in the derivative control unit 11.

As a result, differences in derivative output, namely, $\Delta D_n$ and $\Delta D'_n$ are calculated by the following operation:

When $K \leq 1$, $$\Delta D_n = \{(2 \cdot TD)/(\Delta t + 2 \cdot \eta \cdot TD)\} \cdot (e_n - e_{n-1}) - K \cdot D_{n-1} \quad (32)$$

When $K > 1$, $$\Delta D'_n = (TD/\Delta t) \cdot (e_n - 2e_{n-1} + e_{n-2}) \quad (33)$$

When the velocity type signal is converted into a position type differentiation signal by use of a differences $\Delta D_n$ and $\Delta D'_n$ in derivative output, the following relationships can be induced:

When $K \leq 1$, $$D_n = D_{n-1} + \Delta D_n \text{ of the formula (32)} \quad (34)$$

When $K > 1$, $$D_n = D_{n-1} + \Delta D'_n \text{ of the formula (33)} \quad (35)$$

With the above-described structure of the embodiment, when the judgment condition value K is equal to 1 or smaller, the derivative output by the bilinear transfer such as shown in FIG. 7A is obtained. However, when the judgment condition value K is larger than 1, a derivative output is adjusted by the variation of the control operation period $\Delta t$, and the height of the derivative output is decreased as shown in FIG. 7B. However, the area of a differential is always constant, and therefore a complete derivative type derivative action is carried out. Therefore, the control waveform area same as that of the analog differentiation can be obtained. Consequently, the stability of the control can be further improved, and an effect similar to that of the analog differentiation can be obtained.

The difference of the derivative action on the control amount is transformed as in the first embodiment, and can be obtained by the following equations:

When $K \leq 1$, $$\Delta D_n = \{(2 \cdot TD)/(\Delta t + 2 \cdot \Theta \cdot TD)\} \cdot (PV_{n-1} - PV_n) - K \cdot D_{n-1} \quad (36)$$

When $K > 1$, $$\Delta D'_n = (TD/\Delta t) \cdot (2PV_{n-1} - PV_n + PV_{n-2}) \quad (37)$$

(Third Embodiment)

This embodiment involves a velocity derivation processing unit 4 which has the same structure as that shown in FIG. 4 or 5, except that the following correction coefficients A and B are set when $K \leq 1$ and $K > 1$.

More specifically, under the following conditions:
when $K \leq 1$, A=1, B=K, or
when $K > 1$, A=1/K, B=1/K,
the condition judgment unit 12 sets the correction coefficients A and B in the derivative control unit 11.

As a result, differences in derivative output, namely, $\Delta D_n$ and $\Delta D'_n$ are calculated by the following operation:

When $K \leq 1$, $$\Delta D_n = \{(2 \cdot TD)/(\Delta t + 2 \cdot \eta \cdot TD)\} \cdot (e_n - e_{n-1}) - K \cdot D_{n-1} + tm \quad (38)$$

When $K > 1$, $$\Delta D'_n = (TD/\Delta t) \cdot (e_n - e_{n-1}) - \{(\Delta t + 2 \cdot \eta \cdot TD)/(2 \cdot \Delta t)\} \cdot D_{n-1} \quad (39)$$

The position type derivative signal $D_n$ can be obtained by use of differences $\Delta D_n$ and $\Delta D'_n$ in derivative output, as mentioned before.

The difference in the value of derivative action on the control amount can be obtained by transforming it as in the first embodiment by use of:

When $K \leq 1$, $$\Delta D_n = \{(2 \cdot TD)/(\Delta t + 2 \cdot \eta \cdot TD)\} \cdot (PV_{n-1} - PV_n) - K \cdot Dn - 1 + tm \quad (40)$$

When $K > 1$, $$\Delta D_n = (TD/\Delta t) \cdot (PV_{n-1} - PV_n) - \{(\Delta t + 2 \cdot \eta \cdot TD)/(2 \cdot \Delta t)\} \cdot D_{n-1} \quad (41)$$

With the above-described structure of the embodiment, when the judgment condition value K is equal to 1 or smaller, the derivative output by the bilinear transfer such as shown in FIG. 8A is obtained. However, when the judgment condition value K is larger than 1, the derivative output is gradually and stepwise decreased. However, as shown in FIG. 8B, the portion corresponding to the pull-back portion in the conventional case appears in the positive direction, while keeping the area of the derivative output of each control operation period at constant. Consequently, the safety of the control can be maintained.

(Fourth Embodiment)

This embodiment involves a velocity derivation processing unit 4 which has the same structure as that shown in FIG. 4 or 5, except that the following correction coefficients A and B are set when $K \leq 1$ and $K > 1$.

More specifically, under the following conditions:
when $K \leq 1$, A=1, B=K, or
when $K > 1$, A=1/K, B=$\Delta t/(\Delta t + \eta \cdot TD)$,
the condition judgment unit 12 sets the correction coefficients A and B in the derivative control unit 11.

As a result, differences in derivative output, namely, $\Delta D_n$ and $\Delta D'_n$ are calculated by the following operation:

When $K \leq 1$, $$\Delta D_n = \{(2 \cdot TD)/(\Delta t + 2 \cdot \eta \cdot TD)\} \cdot (e_n - e_{n-1}) - K \cdot D_{n-1} \quad (42)$$

When $K > 1$, $$\Delta D'_n = (TD/\Delta t) \cdot (e_n - e_{n-1}) - \{\Delta t/(\Delta t + \eta \cdot TD)\} \cdot D_{n-1} \quad (43)$$

The position type derivative signal $D_n$ can be obtained by use of differences $\Delta D_n$ and $\Delta D'_n$ in derivative output, as mentioned before.

The difference in the value of derivative action on the control amount can be obtained by transforming it as in the first embodiment by use of:

When $K \leq 1$, $$\Delta D_n = \{(2 \cdot TD)/(\Delta t + 2 \cdot \eta \cdot TD)\} \cdot (PV_{n-1} - PV_n) - K \cdot D_{n-1} \quad (44)$$

When $K > 1$, $$\Delta D_n = (TD/\Delta t) \cdot (PV_{n-1} - PV_n) - \{\Delta t/(\Delta t + \eta \cdot TD)\} \cdot D_{n-1} \quad (45)$$

With the above-described structure of the embodiment, when the judgment condition value K is equal to 1 or smaller, the derivative output by the bilinear transfer such as shown in FIG. 9A is obtained. However, when the judgment condition value K is larger than 1, the derivative output is gradually and stepwise decreased. However, as shown in FIG. 9B, the portion corresponding to the pull-back portion in the conventional case appears in the positive direction, and response characteristics similar to those of the fourth embodiment can be obtained.

Therefore, in each of the embodiments of the present invention, even if the control operation period $\Delta t$ is prolonged with regard to the derivative time TD, a stable derivative control can be obtained.

FIG. 10 is a diagram showing a simulation result in the case where the derivative action of the second embodiment is employed.

Figure 1:
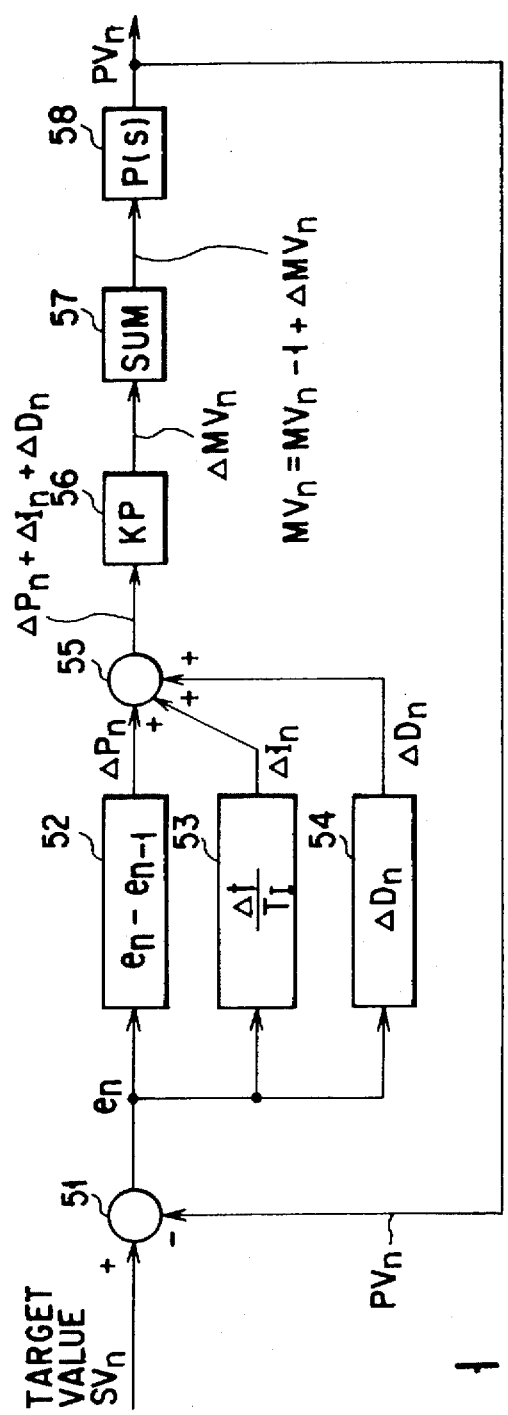
FIG. 1 is a block diagram showing the structure of a conventional digital PID control apparatus.
Figure 2:
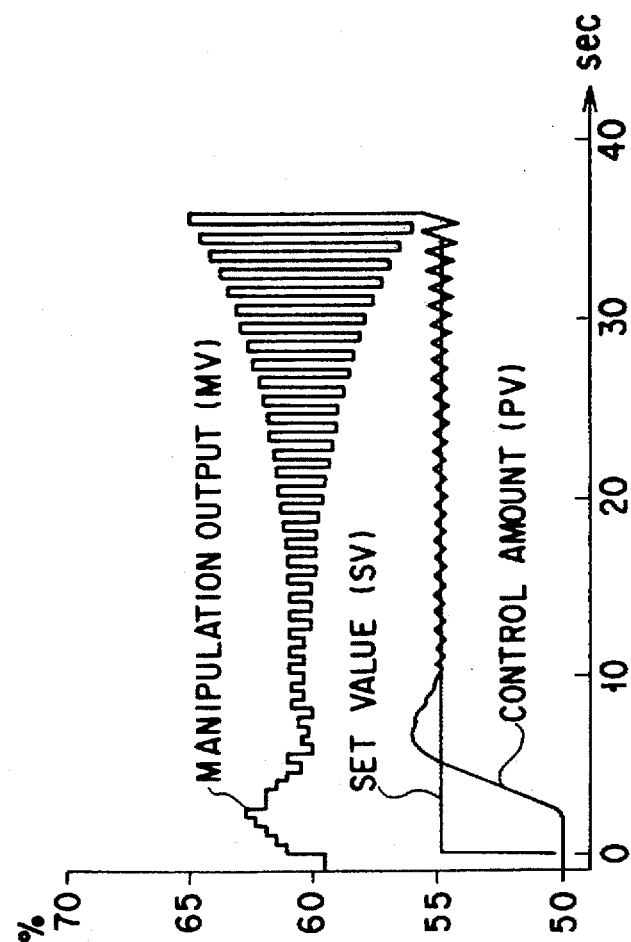
FIG. 2 is a diagram showing a simulation result of the conventional digital PID control apparatus, obtained in the case where the bilinear transfer method is employed and the control operation period is prolonged.

The simulation conditions of this case are the same as those of the case shown in FIG. 2 (prior art). More specifically, with respect to the control object $G(s) = e^{-2s}/(1+5s)$, the following conditions are set: the control operation period $\Delta t$=0.5 sec, $\eta$=0.1, the proportional gain, which is a PID parameter, =2.5, the integral time TI=3.2 sec and the derivative time=0.8 sec. With these conditions, K becomes larger than 1 (K>1), and in the case of the bilinear transfer method, oscillation occurs in the prior art technique. However, with the apparatus of the present invention, the unstable region, which is created by the bilinear transfer method in the prior art, can be removed by setting the correction coefficients A and B and varying the derivative action method. Therefore, even in a DDC involving a long control operation period, a stable control can be realized by employing the bilinear transfer method.

According to the present invention, various effects described below can be achieved.

According to the first embodiment of the present invention, even in the case where the bilinear transfer method, if the judgment condition value K is larger than 1, a complete derivative type derivative action can be performed. Consequently, the pull-back of the derivative output can be completely cut, and the safety of the control can be maintained.

According to the second embodiment of the present invention, even in the case where the bilinear transfer method, if the judgment condition value K is larger than 1, a complete derivative type derivative action can be performed. Consequently, the area of the control waveform can be made the same as that of the analog derivative, and the safety of the control can be further improved.

According to the third embodiment of the present invention, even in the case where the bilinear transfer method, if the judgment condition value K is larger than 1, the derivative action method is varied. Thus, the derivative output is gradually and stepwise decreased, and the pull-back portion, which is created in the prior art technique, appears in the positive direction. Further, the area of the control waveform can be made the same as that of the analog derivative, and the safety of the control can be further improved.

According to the fourth embodiment of the present invention, a differential operation substantially the same as that of the third embodiment, can be achieved, and therefore the safety of the control can be further improved.

As described above, according to the present invention, even in the case of a long control operation period, a differentiation term operation which is appropriate for the control operation period, is performed. An oscillation which is caused by a change in control operation period, can be avoided, and it is possible to make an effective use of the derivative action.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A digital PID (P:proportional, I:integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit comprising:

a judgment unit for judging a control operating period is a predetermined value or less; and an operation unit which carries out a lagged derivative operation by a bilinear transfer method when the control operation period is at the predetermined value or less, or carries out an exact derivative operation when the control operation period is larger than the predetermined value.

2. A digital PID (P:proportional, I:integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit comprising:

a judgment unit for judging whether $K=2-\Delta t/(\Delta t+2\eta \cdot TD) \leq 1$, or $K>1$ by using a control operation at $\Delta t$, a derivative time TD and a derivative gain $1/\eta$; and an operation unit which carries out a lagged derivative operation by a bilinear transfer method when $K \leq 1$, or carries out an exact derivative operation when $K>1$.

3. A digital PID (P:proportional, I:integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit further comprising:

a judgement unit for judging whether $K=2-\Delta t/(\Delta t+2\eta \cdot TD) \leq 1$, or $K>1$ by using a control operation period $\Delta t$, a derivative time TD and a derivative gain $1/\eta$;

means for carrying out the velocity D control operation on the deviation, including a means for extracting velocity type D control operation results $\Delta D_n$, $\Delta D'_n$ and a derivative output $D_n$ by performing the following operation:

when $K \leq 1$, $\Delta n = \{(2 \cdot TD)/(\Delta t+2\eta \cdot TD)\} \cdot (e_n \cdot e_{n-1}) - K \cdot D_{n-1}$ $D_n = D_{n-1} + \Delta D_n$ when $K>1$, $\Delta D'_n = \{(2-TD)/(\Delta t+2\eta \cdot TD)\} \cdot (e_n - 2e_{n-1} + e_{n-2})$ $D_n = D_{n-1} + \Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when $K \leq 1$, $\Delta D_n = \{(2 \cdot TD)/(\Delta t+2\eta \cdot TD)\} \cdot (PV_{n-1} - PV_n) - K \cdot D_{n-1}$, $D_n = D_{n-1} + \Delta D_n$ when $K>1$, $\Delta D'_n = \{(2 \cdot TD)/(\Delta t+2\eta \cdot TD)\} \cdot (2PV_{n-1} - PV_n - PV_{n-2})$ $D_n = D_{n-1} + \Delta D'_n$, where $e_n$: the amount of deviation at the present time, $e_{n-1}$: the amount of deviation at the time of the immediately previous control operation period, $e_{n-2}$: the amount of deviation at the time of one before the immediately previous control operation period, $PV_{n-1}$: the control amount at the time of the immediately previous control operation period, $PV_{n-2}$: the control amount at the time of one before the immediately previous control operation period, $D_n$: the derivative output at present time, and $D_{n-1}$: the derivative output at the time of the immediately previous control operation period.

4. A digital PID (P:proportional, I;integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit further comprising:

a judgement unit for judging whether $K=2 \cdot \Delta t/(\Delta t + 2\eta \cdot TD) \leq 1$, or $K>1$ by using a control operation period $\Delta t$, a derivative time TD and a derivative gain $1/\eta$;

means for carrying out the velocity D control operation on the deviation, including a means for extracting velocity type D control operation results $\Delta D_n$, $\Delta D'_n$ and a derivative output $D_n$ by performing the following operation:

when $K \leq 1$, $\Delta D_n = \{(2 \cdot TD)/(\Delta t + 2\eta \cdot TD)\} \cdot (e_n - e_{n-1}) - K \cdot D_{n-1}$ $D_n = D_{n-1} + \Delta D_n$ when $K>1$, $\Delta D'_n = (TD/\Delta t) \cdot (e_n - 2e_{n-1} + e_{n-2})$ $D_n = D_{n-1} + \Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when $K \leq 1$ $\Delta D_n = \{(2 \cdot TD)/(\Delta t + 2\eta \cdot TD)\} \cdot (PV_{n-1} - PV_n) - K \cdot D_{n-1}$ $D_n = D_{n-1} + \Delta D_n$ when $K>1$, $\Delta D'_n = (TD/\Delta t) \cdot (2PV_{n-1} - PV_n - PV_{n-2})$ $D_n = D_{n-1} + \Delta D'_n$, where $e_n$: the amount of deviation at the present time, $e_{n-1}$: the amount of deviation at the time of the immediately previous control operation period, $e_{n-2}$: the amount of deviation at the time of one before the immediately previous control operation period, $PV_n$: the control amount at the present time, $PV_{n-1}$: the control amount at the time of the immediately previous control operation period, $PV_{n-2}$: the control amount at the time of one before the immediately previous control operation period, $D_n$: the derivative output at present time, and $D_{n-1}$: the derivative output at the time of the immediately previous control operation period.

5. A digital PID (P:proportional, I;integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit further comprising:

a judgement unit for judging whether $K=2 \cdot \Delta t/(\Delta t + 2\eta \cdot TD) \leq 1$, or $K>1$ by using a control operation period $\Delta t$, a derivative time TD and a derivative gain $1/\eta$; and means for carrying out the velocity D control operation on the deviation, including a means for extracting velocity type D control operation results $\Delta D_n$, $\Delta D'_n$ and a derivative output $D_n$ by performing the following operation:

when $K \leq 1$, $\Delta D_n = \{(2 \cdot TD)/(\Delta t + 2\eta \cdot TD)\} \cdot (e_n - e_{n-1}) - K \cdot D_{n-1}$ $D_n = D_{n-1} + \Delta D_n$ when $K>1$, $\Delta D'_n = (TD/\Delta t) \cdot (e_n - e_{n-1}) - \{(\Delta t + 2\eta \cdot TD)/(2 \cdot \Delta t)\} \cdot D_{n-1}$ $D_n = D_{n-1} + \Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when $K \leq 1$, $\Delta D_n = \{(2 \cdot TD)/(\Delta t + 2\eta \cdot TD)\} \cdot (PV_{n-1} - PV_n) - K \cdot D_{n-1}$ $\Delta D_n = D_{n-1} + \Delta D_n$ when $K>1$, $\Delta D'_n = (TD/\Delta t) \cdot (PV_{n-1} - PV_n) - \{(\Delta t + 2\eta \cdot TD)/(2 \cdot \Delta t)\} \cdot D_{n-1}$ $D_n = D_{n-1} + \Delta D'_n$, where $e_n$: the amount of deviation at the present time, $e_{n-1}$: the amount of deviation at the time of immediately previous control operation period, $PV_n$: the control amount at present time, $PV_{n-1}$: the control amount at the time of the immediately previous control operation period, $D_n$: the derivative output at present time, and $D_{n-1}$: the derivative output at the time of the immediately previous control operation period.

6. A digital PID (P:proportional, I:integral, D:derivative) control apparatus, in which a deviation is obtained from a controlling amount of an object to be controlled, and an input target value, a velocity type PI control operation is carried out on the deviation, a velocity type D control operation is carried out on the deviation of the controlling amount, the velocity type control operation outputs are synthesized, and then converted into a position type manipulation signal, and this signal is supplied to the object to be controlled, said digital PID control apparatus comprising:

a derivation processing unit further comprising:

a judgement unit for judging whether $K=2 \cdot \Delta t/(\Delta t + 2\eta \cdot TD) \leq 1$, or $K>1$ by using a control operation period $\Delta t$, a derivative time TD and a derivative gain $1/\eta$;

means for carrying out the velocity D control operation on the deviation, including a means for extracting velocity type D control operation results $\Delta D_n$, $\Delta D'_n$ and a derivative output $D_n$ by performing the following operation:

when $K \leq 1$, $\Delta D_n = \{(2 \cdot TD)/(\Delta t + 2\eta \cdot TD)\} \cdot (e_n - e_{n-1}) - K \cdot D_{n-1}$ $D_n = D_{n-1} + \Delta D_n$ when K>1, $\Delta D'_n = (TD/\Delta t) \cdot (e_n - e_{n-1}) - \{\Delta t/(\Delta t + \eta \cdot TD)\} \cdot D_{n-1}$ $D_n = D_{n-1} + \Delta D'_n$; and means for carrying out the velocity type D control operation on the controlling amount, including a means for extracting velocity type D control operation results $\Delta D_n$, $\Delta D'_n$ and a derivative output $D_n$ by performing the following operation:

when K≦1, $\Delta D_n = \{(2 \cdot TD)/(\Delta t + 2\eta \cdot TD)\} \cdot (PV_{n-1} - PV_n) - K \cdot D_{n-1}$ $D_n = D_{n-1} + \Delta D_n$ when K>1, $\Delta D'_n = (TD/\Delta t) \cdot (PV_{n-1} - PV_n) - \{\Delta t/(\Delta t + \eta \cdot TD)\} \cdot D_{n-1}$ $D_n = D_{n-1} + \Delta D'_n$, where $e_n$: the amount of deviation at the present time, $e_{n-1}$: the amount of deviation at the time of the immediately previous control operation period, $e_{n-2}$: the amount of deviation at the time of one before the immediately previous control operation period, $PV_n$: the control amount at the present time, $PV_{n-1}$: the control amount at the time of the immediately previous control operation period, $PV_{n-2}$: the control amount at the time of one before the immediately previous control operation period, $D_n$: the derivative output at present time, and $D_{n-1}$: the derivative output at the time of the immediately previous control operation period.

\* \* \* \* \*